(12) United States Patent
Graf et al.

(10) Patent No.: US 9,588,231 B2
(45) Date of Patent: Mar. 7, 2017

(54) X-RAY DEVICE AND X-RAY DETECTOR FOR AN X-RAY DEVICE

(71) Applicant: Siemens Aktiengesellschaft, Munich (DE)

(72) Inventors: Alexander Graf, Forchheim (DE); Sven Günther, Goessweinstein (DE); Erhard Schlund, Wiesenthau (DE); Klaus Windsheimer, Spalt (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 117 days.

(21) Appl. No.: 14/592,004

(22) Filed: Jan. 8, 2015

(65) Prior Publication Data
US 2015/0198724 A1    Jul. 16, 2015

(30) Foreign Application Priority Data
Jan. 14, 2014    (DE) .......................... 10 2014 200 526

(51) Int. Cl.
*H05G 1/20*    (2006.01)
*H05G 1/32*    (2006.01)
*G01T 1/175*    (2006.01)

(52) U.S. Cl.
CPC .................................. *G01T 1/175* (2013.01)

(58) Field of Classification Search
CPC .. H05G 1/20; H05G 1/32; H05G 1/46; H05G 1/66; H05G 1/00; H05G 1/08; H05G 1/60; A61B 6/56; A61B 6/4233
USPC   378/101, 105, 91, 96, 107, 16, 37, 131, 28, 378/65; 250/208.1, 366, 368, 370.09, 250/370.11
See application file for complete search history.

(56) References Cited

U.S. PATENT DOCUMENTS

| | | | | |
|---|---|---|---|---|
| 4,035,650 A | * | 7/1977 | Franke | H05G 1/44 378/168 |
| 4,082,953 A | * | 4/1978 | Krause | A61B 6/145 378/168 |
| 4,168,436 A | * | 9/1979 | Aradate | A61B 6/032 378/101 |
| 4,639,943 A | * | 1/1987 | Heinze | H05G 1/36 378/108 |
| 4,700,372 A | * | 10/1987 | Tsuchiya | H05G 1/32 363/138 |

(Continued)

FOREIGN PATENT DOCUMENTS

DE          69614227 T2    2/2002
EP           1967141 B1   10/2011

*Primary Examiner* — David A Vanore
(74) *Attorney, Agent, or Firm* — Harness, Dickey & Pierce, P.L.C.

(57) ABSTRACT

An X-ray device according to an embodiment of the invention includes an X-ray detector including a number of detector elements, the detector elements being subdivided into at least two subgroups, each of spatially linked detector elements. The X-ray device or the X-ray detector includes a voltage supply unit for providing a fundamental voltage. The X-ray detector includes two voltage transformers, of which each is associated with respectively one of the two subgroups. And each of the voltage transformers is configured for converting the fundamental voltage into a detector operating voltage for the detector elements, which is lower than the fundamental voltage.

20 Claims, 1 Drawing Sheet

(56) References Cited

U.S. PATENT DOCUMENTS

| | | | | |
|---|---|---|---|---|
| 5,872,364 | A * | 2/1999 | Strommer | A61B 6/14 250/208.1 |
| 5,923,549 | A * | 7/1999 | Kobayashi | H02M 7/4807 363/17 |
| 6,418,191 | B1 * | 7/2002 | Fehre | H05G 1/20 362/21 |
| 7,593,502 | B2 * | 9/2009 | Katcha | A61B 6/032 378/101 |
| 7,899,150 | B2 * | 3/2011 | Beyerlein | A61B 6/56 378/101 |
| 8,588,371 | B2 * | 11/2013 | Ogawa | H02M 7/53871 378/101 |
| 9,014,336 | B2 * | 4/2015 | Luerkens | H05G 1/10 378/106 |
| 9,107,280 | B2 * | 8/2015 | Hishikawa | H01J 35/10 |
| 2002/0034277 | A1 * | 3/2002 | Laner | A61B 6/14 378/39 |
| 2008/0095314 | A1 * | 4/2008 | Katcha | A61B 6/032 378/101 |
| 2008/0158915 | A1 | 7/2008 | Williams | |
| 2011/0222651 | A1 * | 9/2011 | Ogawa | H02M 7/53871 378/20 |
| 2013/0243161 | A1 * | 9/2013 | Hishikawa | H01J 35/10 378/93 |
| 2013/0251108 | A1 * | 9/2013 | Luerkens | H05G 1/10 378/106 |
| 2015/0198724 | A1 * | 7/2015 | Graf | G01T 1/175 378/114 |

* cited by examiner

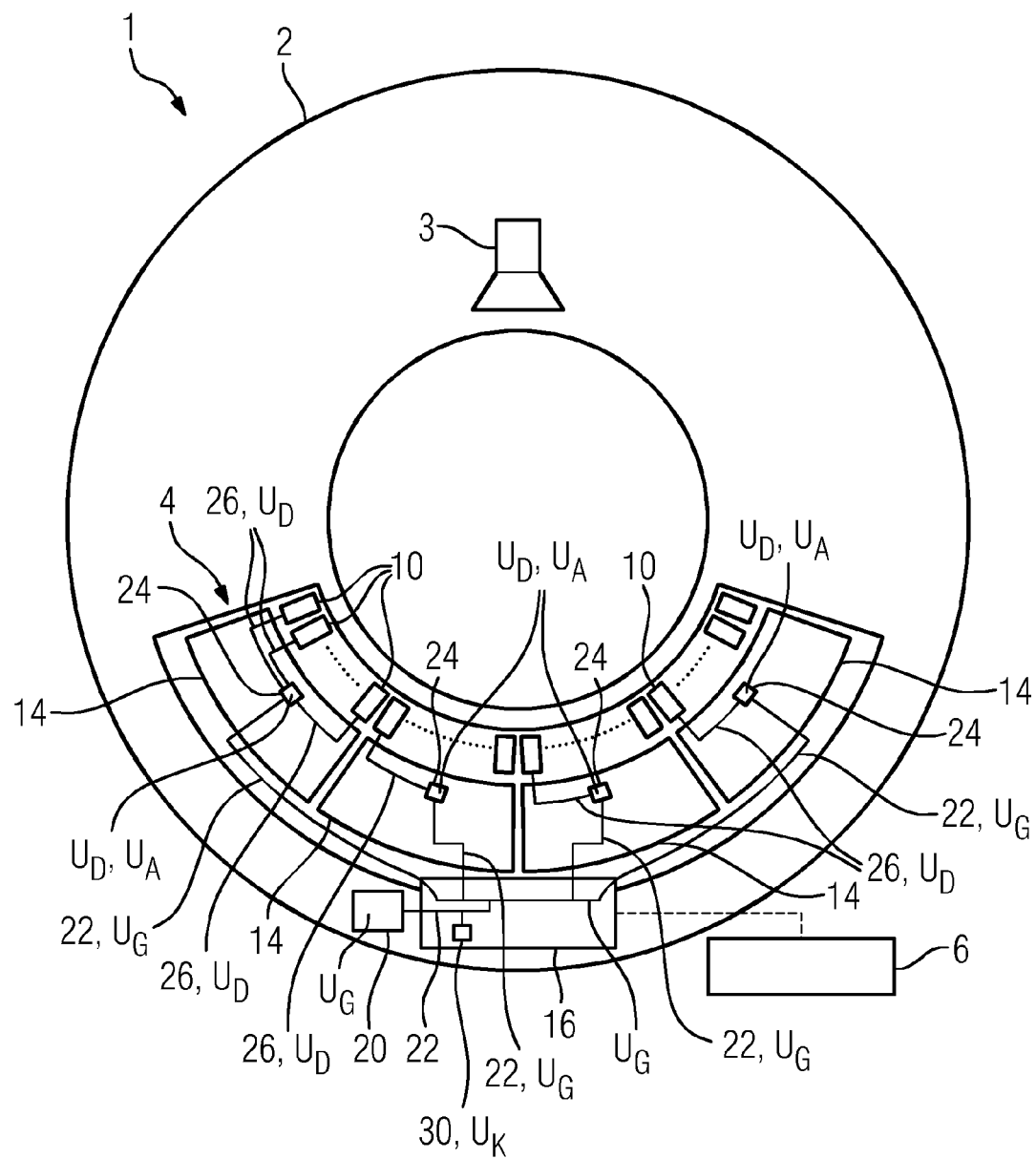

X-RAY DEVICE AND X-RAY DETECTOR FOR AN X-RAY DEVICE

PRIORITY STATEMENT

The present application hereby claims priority under 35 U.S.C. §119 to German patent application number DE 102014200526.4 filed Jan. 14, 2014, the entire contents of which are hereby incorporated herein by reference.

FIELD

At least one embodiment of the invention generally relates to an X-ray device. At least one embodiment of the invention also generally relates to an X-ray detector for an X-ray device.

BACKGROUND

Conventional X-ray devices typically have an X-ray source and an X-ray detector. For an X-ray image recording, a sampled object is positioned between the X-ray source and the X-ray detector. In an X-ray device for medical uses, the sampled object is usually a patient. X-rays are then projected by the X-ray source onto the sampled object. The X-rays penetrate the sampled object and, in the process, are differently attenuated (depending on the density of the sampled object). The intensities of the X-rays (transmitted through the object and therefore attenuated) are detected by means of the X-ray detector.

A distinction is made between indirect-conversion X-ray detectors and direct-conversion X-ray detectors. In order to detect the transmitted X-rays, an indirect-conversion X-ray detector has a sensor layer in the form of a scintillator layer which is sensitive to X-ray radiation and which converts the incident X-ray radiation into visible light. The visible light is then converted, by means of a photodiode, into an electrical signal. In the case of a direct-conversion X-ray detector, the sensor layer is made of a semiconductor material (e.g. cadmium telluride) in which incident X-ray radiation is directly converted into an electrical signal.

Against the background of simple and economical manufacturing of a large-area X-ray detector, the entire detector surface is often composed of small, individually produced units which are referred to below as detector elements. Each detector element herein usually comprises a plurality of detector pixels. This means that each detector element can detect a plurality of signals in a spatially-selective manner and in parallel which, in a subsequently-formed matrix image composed of all the signals (of all the detector elements), each represent an image point of this matrix image. The detector elements themselves are typically arranged in rows or in an array.

Further electronic components which are directly associated with the sensor layer and are configured for reading out the signal from the sensor layer—for example, photodiodes, capacitors, optional analogue-digital converters or the like—are also arranged on the detector elements. The signal, or each signal, detected by the detector elements is usually read out by way of a downstream electronic control unit, further processed (particularly digitally) and prepared for passing on to a downstream image processing unit.

The detector elements are typically operated with a relatively low voltage (often smaller than 5V). This voltage is usually generated by a (central) voltage supply unit for all the detector elements together and distributed to the detector elements. However, due to the often relatively large extent of the detector area and the long electrical transmission routes resulting therefrom, relatively large power losses typically occur along the electrical conductors. In the event that the X-ray device is a computed tomography device (in a tubular construction, also known as a gantry construction), the individual detector elements are arranged, for example, over a length of, for example, 1 m.

SUMMARY

At least one embodiment of the invention enables an energy-efficient voltage distribution for an X-ray detector.

At least one embodiment of the invention is directed to an X-ray device. At least one embodiment is directed to an X-ray detector. Advantageous, and partly per se inventive, embodiments and developments of the invention are disclosed in the subclaims and the description below.

The X-ray device according to at least one embodiment of the invention comprises an X-ray detector ("detector", for short) which has a number of detector elements. The X-ray device also comprises a voltage supply unit for providing a fundamental voltage. The voltage supply unit is preferably configured for the central supply of the detector with the fundamental voltage. Thus, a single central voltage supply unit is provided to supply all the electrical consumers in the detector.

According to at least one embodiment of the invention, the fundamental voltage supplied by the central voltage supply unit has a higher value than the detector operating voltage required by the detector elements. The detector elements are also subdivided into at least two subgroups, each of spatially linked detector elements. The detector now has two voltage transformers (in particular voltage converters) of which each is associated with respectively one of the two subgroups (both functionally and spatially). The voltage transformers are configured and provided for transforming the fundamental voltage into the (lower) detector operating voltage. Preferably, the voltage transformers are also configured to stabilize the detector operating voltage, i.e. to keep it at as constant a voltage value as possible.

The X-ray detector according to at least one embodiment of the invention comprises an X-ray detector, comprises:

a number of detector elements, the detector elements being subdivided into at least two subgroups, each of the at least two subgroups being spatially linked detector elements; and two voltage transformers, each respectively associated with one of the at least two subgroups, wherein each of the voltage transformers is configured to convert a fundamental voltage into a detector operating voltage for the detector elements, the detector operating voltage being lower than the fundamental voltage.

BRIEF DESCRIPTION OF THE DRAWINGS

An example embodiment of the invention will now be described in more detail, making reference to the drawing.

The FIGURE shows schematically extracts of an X-ray device with an X-ray source and an X-ray detector.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the FIGURE. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

A unit of the detector as described above is hereinafter designated a "detector element". A detector element thus has a sensor layer which is sensitive to X-rays in order to convert X-ray radiation directly into an electrical signal (in the case of a direct-conversion detector) or into visible light (in the case of an indirect-conversion detector). In the latter case, a photodiode for converting the visible light into an electrical signal is arranged downstream of the sensor layer. In both cases, the detector element also preferably has a capacitance for intermediate storage of the electrical signal. Suitably, the detector element has a plurality of detector pixels (and thus, in particular, also a plurality of photodiodes and/or capacitors).

The "spatial allocation" of the voltage transformers to the associated subgroup of detector elements should be understood to mean that the voltage transformers are arranged in (particularly substantially) smaller spacings from the detector elements of the respective subgroup than the central voltage supply unit. Preferably, the voltage transformers are arranged at a minimal spacing from the detector elements of the respective subgroup. The length of the electrical conductors between the voltage supply unit and the voltage transformers (hereinafter designated "supply conductors") is preferably significantly greater than the length of the electrical conductors between the voltage transformers and the detector elements (hereinafter designated "feed lines").

Due to the spatial allocation of the voltage transformers to the respective subgroups, the (relatively high-loss) transmission route for the low detector operating voltage is suitably shortened. By means of the relatively long supply conductors between the voltage supply unit and the voltage transformers, however, the electrical power is transmitted with relatively low loss at the (relative to the detector operating voltage) high fundamental voltage.

In a preferred embodiment, the central voltage supply unit supplies a fundamental voltage of approximately 12 V. By contrast, the detector operating voltage has a value, in particular, of less than or equal to 5V, for example, 0.9 V to 3.5 V.

In a preferred embodiment, the detector has an electrical assembly designated a "detector control unit" for each subgroup of the detector elements. Each detector control unit is specifically associated with the detector elements of the respective subgroup. The detector control unit is configured, in particular, to control these detector elements and to read out the respective signals of the detector elements. The detector control units are also suitably arranged spatially closer to the detector elements of their respective subgroup than the voltage supply unit. Arranged on each of the detector control units is, in particular, one of the voltage transformers (in particular, voltage converters). Preferably, the detector control units are arranged—for the sake of a shorter signal transmission and voltage transmission route—with the smallest possible spacing from the detector elements. Depending on the number of associated detector elements, this spacing is, for example, approximately 20 cm to 30 cm. The detector control units are also configured and provided to process the (preferably digital) signals output by the respective detector elements and to provide said signals to an image processing unit for further evaluation.

In a suitable embodiment, the detector has four detector control units (each having its own voltage transformer). Accordingly, the detector elements are divided into four subgroups and each fed together to one detector control unit.

All the individual parts of the detector, in particular the detector control units, can suitably be exchanged individually.

In a suitable embodiment, the voltage transformers are configured as switching regulators or comprise at least one such.

In order to ensure a low-noise detector operating voltage with relatively little effort, in a suitable embodiment, each of the voltage transformers has a pre-regulator for converting the fundamental voltage to an intermediate voltage (of, for example, 4 V to 10 V) and at least one adjustment regulator for converting the intermediate voltage to the (particularly lower than the intermediate voltage) detector operating voltage. The, or each, adjustment regulator is preferably configured as a linear controller which is configured, in particular, to generate the stablest possible, particularly low-noise, voltage value from the intermediate voltage. Within the scope of the invention, it is conceivable that particularly the pre-regulator is configured as a switching regulator.

Suitably, the voltage transformers are configured to output, in addition to the detector operating voltage, an operating voltage for each detector control unit (hereinafter designated "second operating voltage"). In a suitable embodiment, in this case, the voltage transformer has a cascade-like structure with a pre-regulator and one or more adjustment regulators. The second operating voltage is detected between the pre-regulator and the (where applicable, first) adjustment regulator or between two, where applicable, of a plurality of adjustment regulators.

In that different (operating) voltages are generated from the fundamental voltage for different electrical consumers (in particular for the detector elements and the detector control units), the voltage distribution within the detector is simplified. Whilst conventionally each electrical consumer (or at least each group of similar consumers) is fed separately with its respective operating voltage from a central voltage supply unit, in the present case by contrast, only a single fundamental voltage is provided by the central voltage supply unit for the voltage supply to all the electrical consumers of the detector and is converted non-centrally and close to the consumers. The respective operating voltages, in particular the detector operating voltage and the second operating voltage, are thus generated by the voltage transformers directly at the respective consumers or at a small spatial distance therefrom. Thus, the conductor effort (the number and length of the respective electrical lines for the different voltages) can be reduced.

In an alternative embodiment, each of the detector control units carries an additional (separate from the voltage transformer for the detector elements) voltage transformer designated "operating voltage transformer". These operating voltage transformers are configured to transform the fundamental voltage into the second operating voltage needed by each detector control unit.

The detector preferably has a central communications unit which is configured to control the detector control units to read out the signals (pre-)processed by the detector control units and to pass them in a bundled form to the image processing unit. In a preferred embodiment, the fundamental voltage is also fed via the central communications unit and is distributed by said unit to the respective voltage transformers. The central communications unit is suitably arranged spatially between the voltage supply unit and the voltage transformers (or, if applicable, the detector control units).

In a suitable embodiment, the central communications unit also comprises an operating voltage transformer which is configured and provided to convert the fundamental voltage to an operating voltage for the central communications unit.

The detector according to at least one embodiment of the invention comprises the above described detector elements, which are subdivided into at least two, preferably four subgroups. Furthermore, the detector comprises the two (or preferably four) voltage transformers of the type described above, of which each is associated with one of the subgroups of the detector elements.

In the context of at least one embodiment of the invention, it is conceivable that the voltage supply unit is configured separately from the detector (in particular as part of the higher-order X-ray device, in particular a main voltage supply unit of the X-ray device). In this case, the fundamental voltage is fed to the voltage transformers (possibly of the communications unit) that is, from outside of the detector. In a preferred embodiment, however, the central voltage supply unit is provided as part of the detector, i.e. it is integrated in the detector.

In principle, the X-ray device in the context of at least one embodiment of the invention can be one such with a large-area, flat and, particularly during operation, immobile detector. Preferably, however, the X-ray device is a computed tomography device which comprises a detector which is elongate compared with its width (having a length of approximately 1 m). Accordingly, the detector is preferably one such for a computed tomography device.

In the drawing, an X-ray device is shown in the form of a computed tomography device (CT 1, for short). The CT 1 comprises a support frame (not shown in detail) and a (circular) ring-shaped rotary collar 2 rotatably mounted on the support frame. The rotary collar 2 carries an X-ray radiation source (X-ray source 3, for short) and an X-ray detector (detector 4, for short) arranged opposing the X-ray source 3. The detector 4 is configured and provided to detect the X-rays emitted by the X-ray source 3, specifically their intensity attenuated by a sampled object arranged between the X-ray source 3 and the detector 4, to convert the intensity into electrical signals and to output said electrical signals to an image processing unit 6. The image processing unit 6 is arranged stationary outside the rotary collar 2 (i.e. not in the rotating part of the CT 1). The image processing unit 6 is a computer unit (e.g. a computer, a graphics card, etc.) which is placed next to the support frame of the CT 1.

The detector 4 comprises a number of (individual) detector elements 10 which are arranged adjacent to one another along a circular arc of the ring-shaped rotary collar 2. The detector elements 10 carry an X-ray sensitive ceramic plate known as the "sensor layer" (scintillator ceramics material, not shown in greater detail), by means of which incident X-rays are converted into visible light. Furthermore, the detector elements 10 each carry a plurality of photodiodes which are arranged directly downstream of the sensor layer. Said photodiodes detect—each as a single image point (pixel)—the light generated by the X-ray radiation from a delimited region of the sensor layer in each case. This light is then converted by the photodiodes into an electrical signal.

The detector elements 10 of the detector 4 are subdivided into four equal-sized subgroups, which each comprise 12 detector elements 10. The detector elements 10 of a subgroup are arranged spatially together, that is adjoining one another. A detector control unit 14 which is also part of the detector 4 is further associated with each subgroup. The detector control units 14 are configured and provided (in a manner not shown in detail) to read out the signals generated by the detector elements 10, to process them further in digital form and then to pass them on to a central communications unit 16 of the detector 4. The communications unit 16 bundles the signals of the four detector control units 14 and passes the signals on, bundled again, to the image processing unit 6.

During operation of the detector 4, the detector elements 10, the detector control units 14 and the communications unit 16 require different electrical (operating) voltages. For voltage supply to these electrical assemblies (consumers), the detector 4 has a central voltage supply unit 20. The voltage supply unit 20 is configured to make a fundamental voltage $U_G$ (of 12V) available. This fundamental voltage $U_G$ is fed via supply conductors 22 to the communications unit 16 and is distributed from there to the detector control units 14. The fundamental voltage $U_G$ is higher than the voltages required by the communications unit 16, the detector control units 14 and the detector elements 10. Therefore, at least one voltage transformer 24 which reduces the fundamental voltage $U_G$ to a detector operating voltage $U_D$ provided for the detector elements 10 is arranged on each detector control unit 14. The detector operating voltage $U_D$ is transmitted by the voltage transformer 24, in each case, via feed lines 26—which are short relative to the supply conductors 22—to the detector elements 10. The detector operating voltage $U_D$ has a value of, for example, 2.5 V. Since the relatively low detector operating voltage $U_D$ is transmitted via the short feed lines 26, whereas the relatively high fundamental voltage $U_G$ is conducted via the longer supply conductors 22, electrical power losses can be kept particularly low overall.

The voltage transformers 24 are also configured to keep the detector operating voltage $U_D$ particularly noise-free. By this, a particularly precise signal detection is enabled through the detector elements 10. Furthermore, the voltage transformers 24 are configured to reduce the fundamental voltage $U_G$ to a further voltage (designated "operating voltage" $U_A$) with a value of 5 V for operating the detector control units 14.

Arranged on the communications unit 16 is a further voltage transformer (designated "operating voltage transformer" 30). This operating voltage transformer 30 is configured to reduce the fundamental voltage $U_G$ to an operating voltage $U_K$ for the communications unit 16 also with a value of 5 V. The detector operating voltage $U_D$ and the operating voltages $U_A$ and $U_K$ are thus each generated locally (i.e. directly at or close to the respective assembly) from the fundamental voltage $U_G$, so that transmission routes for relatively small voltages in the region of <5 V are minimized.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The subject matter of the invention is particularly clearly disclosed in the example embodiment described above. However, the subject matter of the invention is not restricted to this example embodiment. But further example embodiments of the invention can be derived from the above description by a person skilled in the art.

What is claimed is:
1. An X-ray device, comprising:
   an X-ray detector including a number of detector elements, wherein the detector elements are subdivided into at least two subgroups, each of spatially linked detector elements; and
   a voltage supply unit to provide a fundamental voltage, wherein the X-ray detector includes two voltage transformers, each respectively associated with one of the two subgroups, and wherein each of the voltage transformers is configured to convert the fundamental voltage into a detector operating voltage for the detector elements, the detector operating voltage being relatively lower than the fundamental voltage.
2. The X-ray device of claim 1, wherein the voltage transformers are each arranged on a respective detector control unit, each of the detector control units being asso- ciated with one of the two subgroups and arranged spatially relatively closer to the detector elements than the voltage supply unit.

3. The X-ray device of claim 1, wherein the voltage transformers comprise a switching regulator or are configured as switching regulators.

4. The X-ray device of claim 1, wherein each voltage transformer includes a pre-regulator to convert the fundamental voltage to an intermediate voltage and includes at least one adjustment regulator to convert the intermediate voltage to the detector operating voltage.

5. The X-ray device of claim 2, wherein the voltage transformers are additionally configured to convert the fundamental voltage into an operating voltage for each detector control unit.

6. The X-ray device of claim 2, wherein the X-ray detector includes two operating voltage transformers, each being arranged on one of the detector control units, and wherein the voltage transformers are respectively configured to convert the fundamental voltage into an operating voltage for each respective detector control unit.

7. The X-ray device of claim 1, wherein the X-ray detector includes a central communications unit, arranged between the voltage supply unit and the voltage transformers, and wherein the fundamental voltage is fed to the voltage transformers via the central communications unit.

8. The X-ray device of claim 7, wherein the central communications unit includes an additional operating voltage transformer to convert the fundamental voltage to a separate operating voltage for the communications unit.

9. An X-ray detector, comprising:
a number of detector elements, the detector elements being subdivided into at least two subgroups, each of the at least two subgroups being spatially linked detector elements; and
two voltage transformers, each respectively associated with one of the at least two subgroups, wherein each of the voltage transformers is configured to convert a fundamental voltage into a detector operating voltage for the detector elements, the detector operating voltage being lower than the fundamental voltage.

10. The X-ray device of claim 2, wherein the voltage transformers comprise a switching regulator or are configured as switching regulators.

11. The X-ray device of claim 2, wherein each voltage transformer includes a pre-regulator to convert the fundamental voltage to an intermediate voltage and includes at least one adjustment regulator to convert the intermediate voltage to the detector operating voltage.

12. The X-ray device of claim 3, wherein the voltage transformers are additionally configured to convert the fundamental voltage into an operating voltage for each detector control unit.

13. The X-ray device of claim 4, wherein the voltage transformers are additionally configured to convert the fundamental voltage into an operating voltage for each detector control unit.

14. The X-ray device of claim 3, wherein the X-ray detector includes two operating voltage transformers, each being arranged on one of the detector control units, and wherein the voltage transformers are respectively configured to convert the fundamental voltage into an operating voltage for each respective detector control unit.

15. The X-ray device of claim 4, wherein the X-ray detector includes two operating voltage transformers, each being arranged on one of the detector control units, and wherein the voltage transformers are respectively configured to convert the fundamental voltage into an operating voltage for each respective detector control unit.

16. The X-ray device of claim 1, wherein the X-ray device is a computed tomography (CT) device.

17. The X-ray detector of claim 9, wherein the X-ray detector includes a central communications unit, arranged between the voltage supply unit and the voltage transformers, and wherein the fundamental voltage is fed to the voltage transformers via the central communications unit.

18. The X-ray detector of claim 17, wherein the central communications unit includes an additional operating voltage transformer to convert the fundamental voltage to a separate operating voltage for the communications unit.

19. An X-ray device including the X-ray detector of claim 9.

20. The X-ray device of claim 19, wherein the X-ray device is a computed tomography (CT) device.

* * * * *